J. R. AYERS.
GUANO SOWER.
APPLICATION FILED AUG. 12, 1915.
1,161,370.
Patented Nov. 23, 1915.
4 SHEETS—SHEET 4.
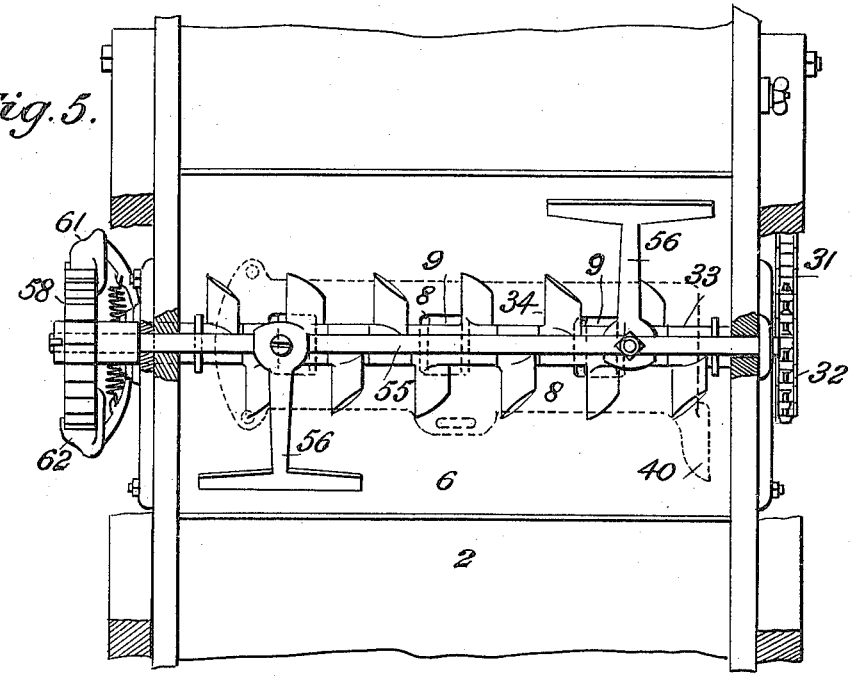
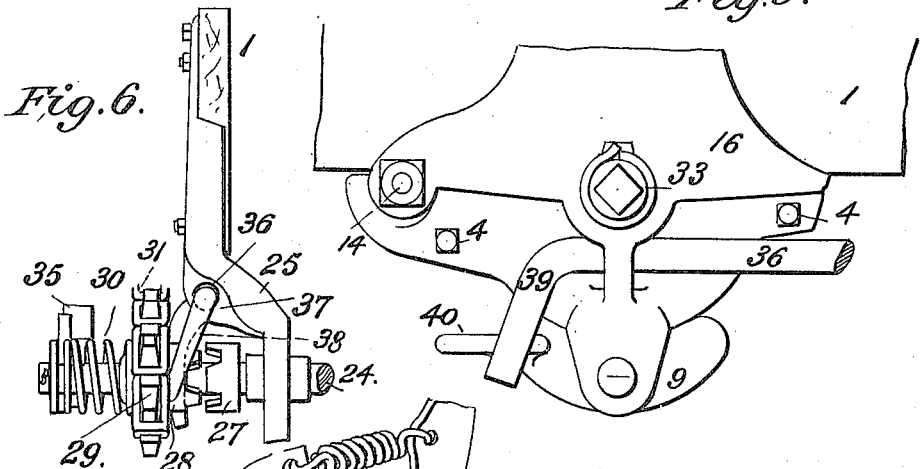
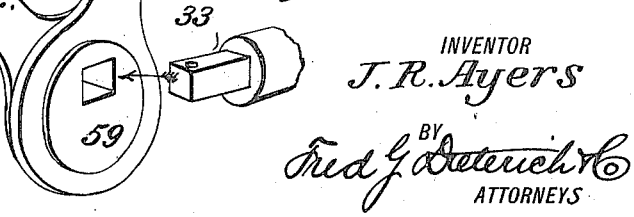
INVENTOR
J. R. Ayers
BY
Fred G. Dieterich & Co.
ATTORNEYS

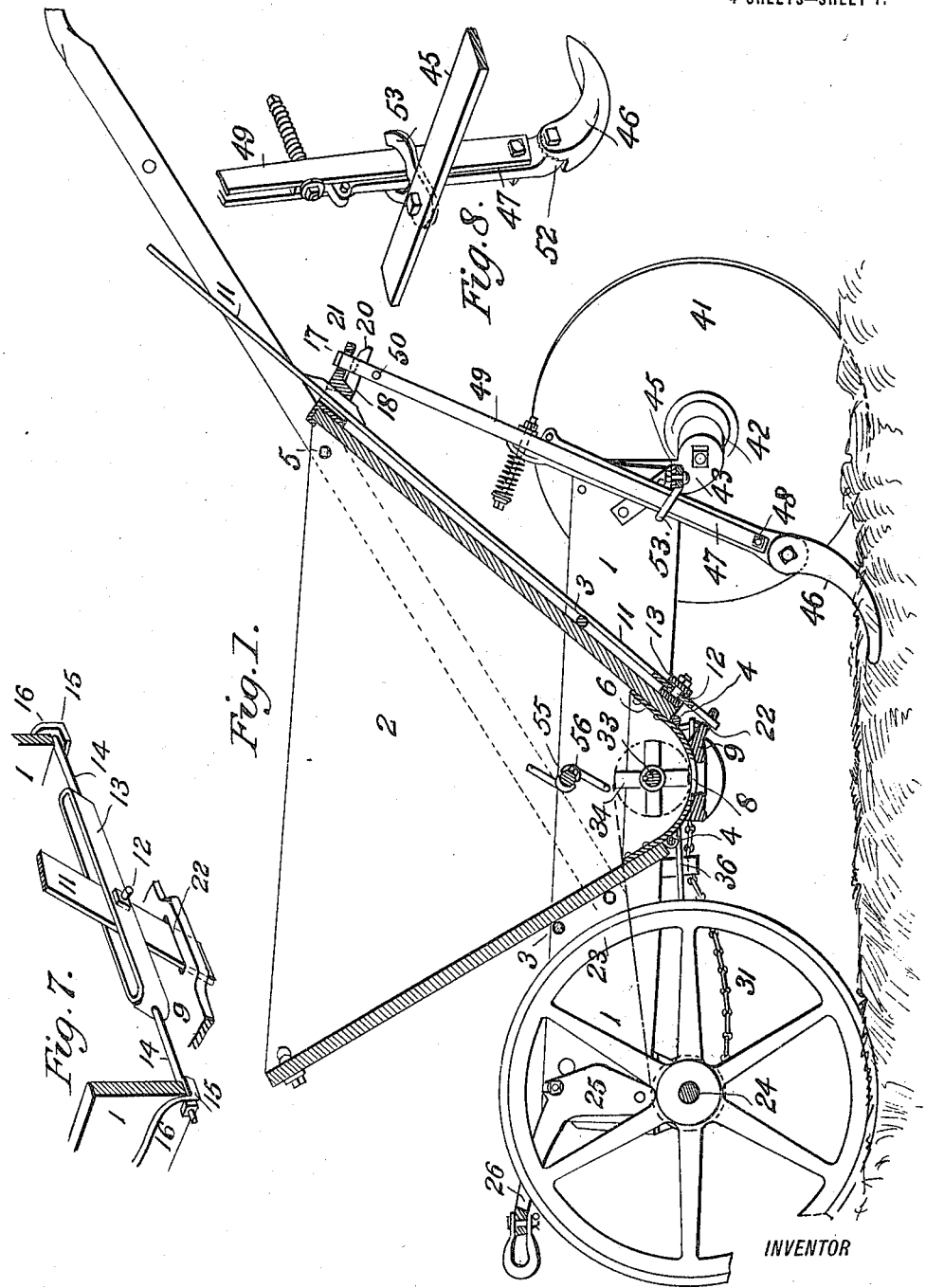

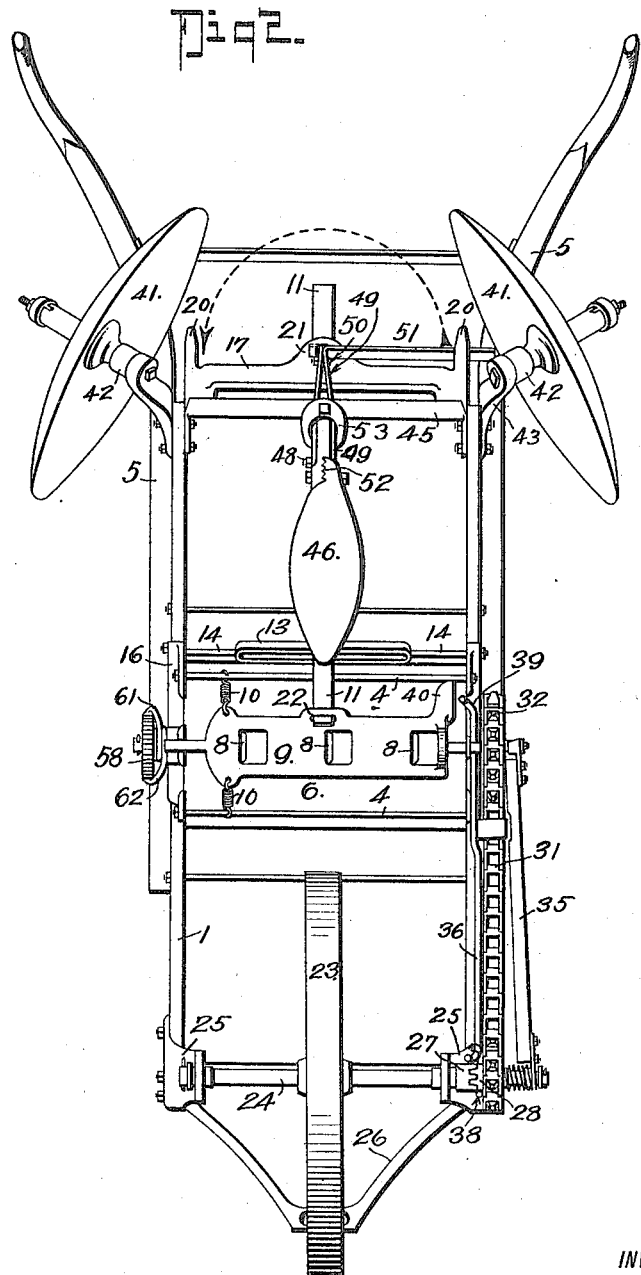

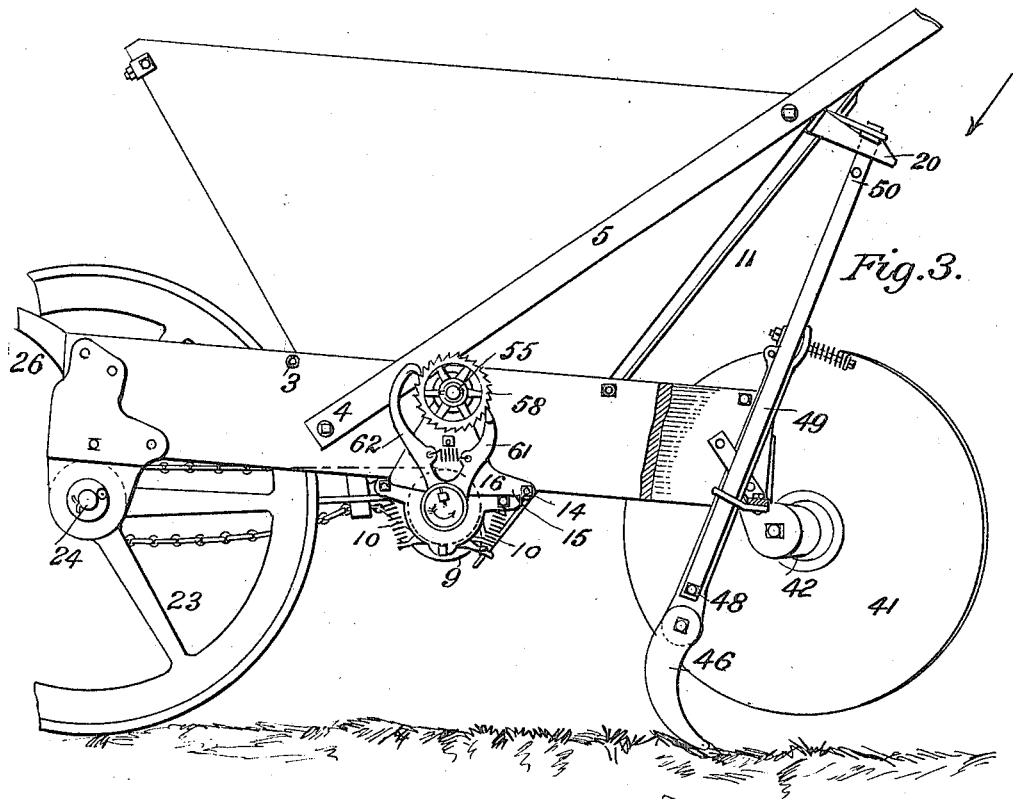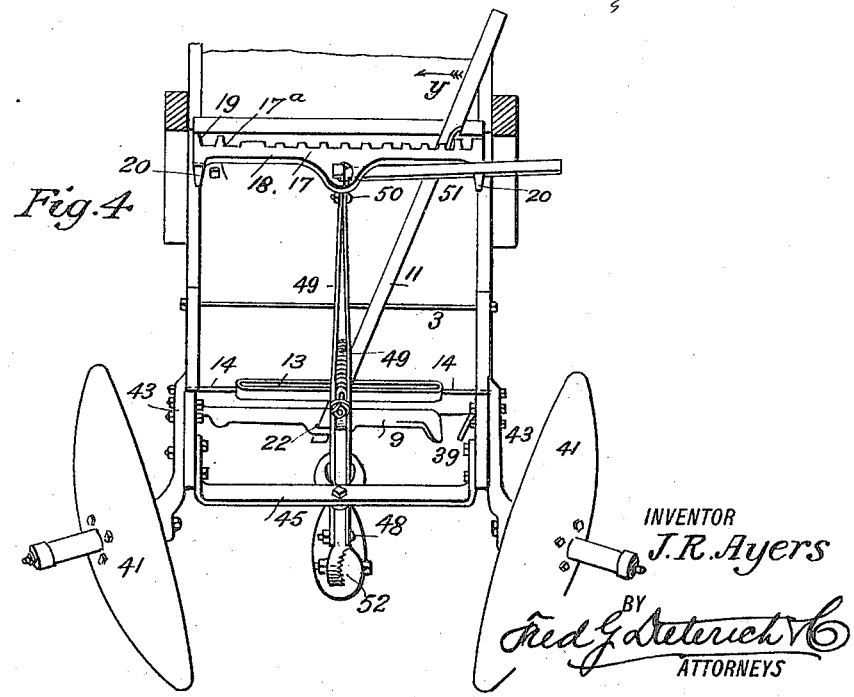

UNITED STATES PATENT OFFICE.

JAMES R. AYERS, OF PETERSBURG, VIRGINIA.

GUANO-SOWER.

1,161,370.

Specification of Letters Patent.

Patented Nov. 23, 1915.

Application filed August 12, 1915. Serial No. 45,191.

*To all whom it may concern:*

Be it known that I, JAMES R. AYERS, residing at Petersburg, in the county of Dinwiddie and State of Virginia, have invented certain new and useful Improvements in Guano-Sowers, of which the following is a specification.

My present invention has reference to that type of fertilizer distributers, especially designed for sowing guano and generally disclosed in my Patent #1068381, dated July 22, 1913.

One of the objects of my present invention is to provide in connection with the rear disks a hoe located between the disks for loosening up the bottom of the furrow and mixing the fertilizer with the ground, and which is adjustably mounted on a vertically extended shank rotatably mounted with respect to the hopper and the rear disks and adapted for being held locked to its reversely adjusted positions, whereby, when transporting the machine the hoe may be reversed so that it curves backward and becomes a skid or runner to carry the weight of the rear end of the machine.

Another object of my present invention is to simplify and render more economical the construction of the hopper and the main frame.

Again, my invention has for its purpose to provide an improved coöperative arrangement of a means, in the nature of rotary auger-like members for uniformly feeding the fertilizer to the dropping passages in the bottom of the hopper and a stirrer that works over the said auger-like members for preventing bridging or choking of the fertilizing and speed reducing devices connecting the auger-like members and the stirrer for turning the said stirrer at a relatively slow speed to that of the auger feed devices that crowd the fertilizer to the discharge openings.

Again, my present invention embodies an improved means for shifting the gate or cut-off member that regulates the size of the discharge passages in the hopper bottom and the shifting devices for throwing out the clutch connection with the drive shaft for putting out of action the sowing mechanism, and all of which is controlled by the shifting movements of a single lever.

With other objects in view that will hereinafter appear, my present invention is an improved guano sower that embodies the peculiar and novel features of construction and the combination of the parts that constitute the complete sower, all of which will be hereinafter fully explained, specifically pointed out in the appended claims and illustrated in the accompanying drawings, in which:

Figure 1 is a vertical longitudinal section of my improved guano fertilizer, the parts being at the normal or operative position. Fig. 2 is a bottom plan view thereof. Fig. 3 is a side elevation of parts thereof, the earth opener being shown adjusted as a skid and the covering disks elevated above the ground. Fig. 4 is a rear elevation partly perspective, see arrow *a*, Fig. 3, that illustrates the lever devices for shifting the feed passages controlling gate, and combined earth opener and skid, the latter being shown at its earth loosening position. Fig. 5 is a plan view, parts being in section, of the hopper, the agitator or feeder and the stirrer devices. Fig. 6 is an end perspective view of the shiftable clutch member of the transmission mechanism hereinafter referred to. Fig. 7 is a detail perspective view of the bail shaped bearing for the gate shifting lever. Fig. 8 is a detail perspective view of the combined earth opener plow and skid, the same being shown at the normal "plow" position. Fig. 9 is an end elevation of a portion of one of the side castings having the bearing for the clutch shifting rocker bar and the end of the shiftable hopper control gate that coöperates therewith. Fig. 10 is a detail view of the eccentric device carried by the agitator or auger device and which actuates the pawls for transmitting "slow motion" to the stirrer devices.

In my present invention, the main frame and hopper are formed entirely of wood composed preferably of six inch boards and which includes two side pieces 1—1 upon which the hopper proper 2 is built up, the sides of the hopper being clamped at the ends by a cross or bolt rod 3, and the side pieces 1—1 likewise clamped by the rod bolts 4—4, and the said hopper and side members are further braced by the handle bars 5—5 secured by the rod bolts 3 and 4, as shown.

6 designates a sheet metal bottom for the hopper secured upon the inside of the bottom of the hopper (see Fig. 2) and which has a number of fertilizer passages or slots 8, the size of which is controlled by lateral shifting of a slotted metal gate member 9 that rides on the metal bottom 6, is held to its seat by the springs 10 (see Fig. 3) and is shifted to regulate the feed passages in the hopper bottom by hand control devices, the construction of which is clearly shown in Figs. 2 and 4.

The hand control devices referred to comprise a long lever bar 11 fulcrumed at 12 in an elongated bail shaped strap iron 13 the ends of which are joined with draw bolts 14 that are mounted in the lugs 15 of the metal or end castings 16 which form the ends of the hopper bottom and which are bolted to the wooden sides 1—1 of the frame. At this point, it should be stated that in my other patent referred to the shifting lever for adjusting the gate for the fertilizer passages in the hopper bottom is fulcrumed on the wooden back of the hopper. I have found that in thus fulcruming the lever that, by reason of rotting of the wood back, or by shrinkage, the fulcrum is either weakened or so thrown out of gear that the desired close adjustment of the gate cannot, without difficulty, be made. By fulcruming the said lever on the metal bail piece connected to the metal end brackets, as stated, the objections in the use of the fulcrum connection in my other patent referred to are entirely overcome, since a permanent or fixed fulcrum connection is provided for that cannot be effected by the wearing out or shrinkage of the wooden hopper. Lever 11 extends up above the rear end of the hopper and is coöperatively connected with a cross rack 17 formed on a casting 18 secured to the upper edge of the rear end of the hopper and which includes a supplemental notch 19, the purpose of which will presently appear. Casting 18 also includes a pair of rearwardly extended notched fingers 20—20, one at each end of the casting, and a central apertured ear 21, as is best shown in Fig. 4 of the drawing.

The lower end of the shifting lever 11 engages a slot 22 in the gate member 9 and by reason thereof and the manner in which the said lever is fulcrumed, the casting can be readily moved to partly or wholly open the fertilizer passages in the hopper bottom by moving the lever along the direction indicated by the arrow $y$, it being understood that when the said lever engages the last one 17ª of the notches in the bar 17, the said passages are entirely closed.

23 designates a front carrier wheel journaled on an axle 24 mounted on the metal bracket bearing 25—25 bolted to the front end of the wooden sides 1 and to which the ends of the angle frame or draft member 26 are detachably connected. Axle 24 carries a fixedly attached clutch 27 for engaging a clutch member 28 on a sprocket wheel 29 slidably mounted on axle 24 and normally held in mesh with the clutch 27 by a stout coil spring 30.

31 designates an endless sprocket chain that takes around the sprocket wheel 29 and a sprocket wheel 32 on the shaft 33 that carries the auger-like feed devices 34 located over the fertilizer outlets in the hopper bottom. A connecting bar 35 is mounted at one end on the sprocket wheel end of the shaft 33 and its other end is slidably mounted on one end of the axle 24 and forms an abutment for the coiled spring 30.

36 designates a rocker bar mounted on the bottom of the casting 16 adjacent one of the wooden sides 1 and it extends along the said side 1 and has its front end held to engage a bearing 37 on the adjacent bracket member 25, the said adjacent end terminating in a forked finger 38 that straddles the axle 24 and engages the slidable sprocket carrying wheel 29 (see Figs. 6 and 2). Rocker bar 36 also has a crank member 39 that extends over and is adapted for being engaged by an extension 40 on one end of the gate 9, the several parts being relatively so positioned that when the lever 11 is swung over to the limit to engage the notch 19, the gate 9 engages the crank 39 and thereby rocks the bar 36 and causes its forked finger to push the clutch wheel 29 back to disengage the clutch members 27—28 and thereby hold the operating mechanism of the machine out of gear.

41—41 designate the rear disks or coverers and they are suitably mounted on stub shafts 42 that extend diagonally rearward rearwardly from the brackets 43 attached to the rear ends of the side members 1—1 of the main frame, which ends, it should be stated are braced by the metal cross bar 45 (see Fig. 4).

46 designates a plow or hoe that is located between the rear disks and is adjustably mounted on the lower end of a bearing metal shank 47 in the manner best shown in Figs. 1 and 8, by reference to which it will be noticed shank 47 is fulcrumed, near its lower end, on a stud bolt 48 that takes through the lower ends of a pair of spaced heavy strap metal hangers 49—49, the upper ends of which are connected by a bolt 50, one of the said ends extending through the ear 21 in the rack casting 17, the other end being bent at right angles to form a spring handle 51 for engaging and interlocking with either one of the notched fingers 20 at the opposite ends of the said casting, as shown. For fixedly holding the hoe to its adjusted positions on the shank, the clamping faces of the shank and the hoe are serrated, as indicated by 52, see Fig. 8. A bifurcated member 53 is attached to the metal cross or brace bar 45 that joins the rear ends of the frame sides 1 and the said member 53 forms a bearing for the lower end of the strap hangers 49 and the shank 47.

By mounting the earth opener or hoe 46 in the manner stated, the hangers 49 and the shank can be readily turned in the bearings 21 and 53, by swinging the handle 51 (see dotted arrows Fig. 2) from one position to another, it being understood that when the hoe is adjusted as indicated on the drawings, when swung about to the reverse position it lifts the disks off the ground and serves as a skid when transporting the machine (see Fig. 3).

In my present invention I have overcome the objections noted by providing for rotating the stirrer devices at a relatively slow speed and for such purpose, the shaft 55 of the stirrer 56, that is mounted above the feeding auger or agitator devices, is connected with the shaft 33 of the said agitator devices, by speed reducing mechanism, the construction of which is best shown in Fig. 3, by reference to which it will be seen the stirrer shaft 55 carries a ratchet gear 58 and the shaft 33, a crank disk 59 (see Fig. 10), on which is mounted a pusher pawl 61, which, upon each revolution of the shaft 55 is swung up and imparts a partial rotation to the gear 58, the gearing shown in the drawing being relatively such that the stirrer rotates about one tenth as fast as the combined agitator and feed device connected therewith. 62 designates a pull pawl for the gear 58.

By reason of driving the stirrer and the agitator devices at respectively slow and fast speeds, all danger of the guano becoming pasty or sticky or bridging is avoided and the bulk is kept sufficiently loosened to cause it to constantly gravitate to the hopper bottom in such a manner that a uniform discharge or swing is effected.

From the foregoing taken in connection with the accompanying drawings, the complete construction and the manner in which my improved guano sower operates will be readily understood.

It should be stated in my present invention, the hand controlled means for shifting the gate, that regulates the openings in the hopper bottom and releases the clutch connections materially differ from like devices disclosed in my patented machine referred to in that the throw lever in my present construction is free for being manipulated to slide the gate, that controls the hopper openings, to wholly or partially close the said opening without affecting the condition of the clutch mechanism that controls the driving power for operating the agitator or auger feed and stirrer devices, since my present construction has a supplemental movement that comes into play only after the said lever shall have reached the limit of its movement for entirely closing the feed or discharge from the hopper.

In operation, when it is desired to transport the fertilizer in the hopper without sowing it, the lever 11 is swung over in the direction indicated, until it reaches the last of the series of notches in the bar 17, after which the said lever is swung farther in the direction indicated and since the lug on the slide gate 7 is now in engagement with the rock rod or shaft, it follows as the final or supplemental motion is thus imparted to lever 11, the rock rod or shaft is turned to bring its forked end fingers into engagement with the clutch disk which now slides back on its axle 24 and disconnected from the clutch on shaft 24.

In the drawings, I have illustrated a practical or preferred arrangement of the details of construction but I desire it understood that in practice the said details may be readily varied or modified without departing from my invention as set out in the appended claims.

While I have shown and described, in this application, the specific construction of all of the several parts that are included in my complete improved guano sower, I make no claim in this application for the combined hoe and skid construction and the agitator and stirrer devices and their coöperative gear connection, since they form the subject matter of another application filed on August 17, 1915, Serial No. 45993.

What I claim is:

1. In a guano sower, a hopper having a delivery opening in its bottom, and a rotary fertilizer agitator and feeding means mounted in the hopper over the said opening, a gate slidably mounted on the hopper for controlling the size of the delivery opening, a driven shaft, connections that join the shaft and the rotary feeding means for imparting movement to the said means, said connections including a shiftable clutch connection normally held to its operative position, a clutch shifter and a single lever mechanism coöperatively joined with the said gate and clutch connection and adapted for shifting the gate to close the feed opening in the hopper and after closing the said opening to effect a movement of the clutch shifter to shift the clutch connection to an inoperative or released position.

2. In a guano sower, a hopper having a delivery passage in its bottom, a driven axle on the sower frame, a fertilizer disturbing means mounted within the hopper and including a rotary member, a driven shaft mounted on the sower frame, connections that join the said shaft and the rotary member and which include a shiftable clutch having means tending to normally hold it to its clutched or operative position, a clutched shifter, a gate slidable on the hopper bottom for opening and closing the delivery passage in the hopper and adapted when shifted beyond the passage closing point to engage and actuate the clutch shifter and a lever for shifting the said gate.

3. In a guano sower, a hopper having a delivery passage in its bottom, a driven axle on the sower frame, a fertilizer disturbing means mounted within the hopper and including a rotary member, a driven shaft mounted on the sower frame, connections that join the said shaft and the rotary member and which include a shiftable clutch having means tending to normally hold it to its clutched or operative position, a clutch shifter, a gate slidable on the hopper bottom for opening and closing the delivery passage in the hopper and adapted when shifted beyond the passage closing point to engage and actuate the clutch shifter and a lever for shifting the said gate, and means mounted on the upper rear end of the hopper for holding the lever to its shifted positions.

4. In a guano sower, a main frame including opposite sides, a hopper having a delivery passage in its bottom, a transverse metal bearing member having means at each end for adjustably connecting the opposite ends thereof with the adjacent sides of the frame, a lever fulcrumed on the said metal bearing, a gate slidably mounted on the under face of the hopper for controlling the discharge and connected to the lower end of the lever, and means mounted on the upper end of the hopper for holding the lever to its adjusted positions.

5. In a guano sower, the combination with the main frame and the hopper mounted thereon, said hopper having fertilizer passages in the bottom thereof, a gate slidably mounted on the bottom of the hopper for regulating the size of the said passages, a lever for shifting the gate, an agitator horizontally rotatable over the hopper passages, a ground wheel mounted in the front end of the frame, a clutch member fixedly mounted on the ground wheel axle, a drive gear having a clutch, slidably mounted on the axle to coöperate with the clutch thereon, a gear on the agitator shaft in connection with the clutch gear, a rock shaft mounted on the frame in parallelism with the connection for the driven gears, said shaft having a crank portion at one end adapted for being engaged by the slidable gate, an angle member at the other end for engaging the shiftable clutch gear.

6. In a guano sower, a frame, a hopper provided with delivery openings, a rotatable agitator mounted over the said openings and rotating in a horizontal plane, a gate slidably mounted on the bottom of the hopper to control the openings thereon, a driving means for the agitator, including a shiftable clutch, a lever, a cross member on which the lever is fulcrumed, means connected with each end of the said member for adjustably governing the said ends with the opposite sides of the frame, means on the upper rear end of the hopper for holding the lever to its shifted positions, the said sliding gate including a slotted ear that receives the lower end of the lever and clutch shifting devices mounted on the frame operable by the sliding gate when the latter has been moved to close the delivery openings in the hopper.

7. In a machine as described, in combination with a frame, a hopper having a discharge opening in its bottom, a ground wheel in advance of the hopper, an agitator rotatably mounted within the hopper over the said discharge opening, power transmission means that couple up the ground wheel axle and the rotary agitator, said means including a shiftable clutch connection, a gate slidably mounted on the hopper for controlling the discharge passage, a clutch shifter including a rock shaft having a crank to be engaged by the shiftable gate when the latter has been moved to close off the lever for shifting the gate.

8. In a machine as described, the combination with the hopper having a discharge passage in its bottom, a slidable gate operable over the bottom for opening and closing the said passage, and an agitator within the hopper rotatably mounted over the said discharge opening; of a driven shaft on the framing of the machine, a power transmission that connects the shaft and the rotary agitator, said transmission including a shiftable clutch connection, and a throw lever that joins the slidable gate for moving the gate to partially or wholly close off the discharge passage and clutch shifting means mounted on the frame adapted for being engaged by further movement of the said gate after it has been moved to close the said discharge passage as set forth.

JAMES R. AYERS.

Copies of this patent may be obtained for five cents each, by addressing the "Commissioner of Patents, Washington, D. C."